United States Patent [19]

Kato et al.

[11] Patent Number: 4,542,660

[45] Date of Patent: Sep. 24, 1985

[54] CAM-TYPE HYDRAULIC DRIVING DEVICE

[75] Inventors: Hisanori Kato; Masao Okawa, both of Niihama, Japan

[73] Assignee: Sumitomo Heavy Industries, Ltd., Tokyo, Japan

[21] Appl. No.: 409,976

[22] Filed: Aug. 20, 1982

[30] Foreign Application Priority Data

Aug. 28, 1981 [JP] Japan ............................... 56-134290

[51] Int. Cl.[4] ......................... F01B 1/06; F01B 13/06; F16H 21/50; F16H 37/06

[52] U.S. Cl. .......................................... 74/27; 74/53; 74/665 GA; 91/491; 92/12.1

[58] Field of Search ........................ 74/27, 53, 55, 104, 74/828, 838, 665 GA; 91/491; 92/12.1; 417/273

[56] References Cited

U.S. PATENT DOCUMENTS

| | | | |
|---|---|---|---|
| 912,198 | 2/1909 | Stafford | 74/665 GA X |
| 961,206 | 6/1910 | Brower | 74/27 |
| 1,073,633 | 9/1913 | Romeyn | 74/838 X |
| 1,343,331 | 6/1920 | Miller | 91/491 X |
| 2,382,452 | 8/1945 | Svenson | 92/12.1 |
| 2,945,451 | 7/1960 | Griswold | 91/491 |
| 3,043,228 | 7/1962 | Bennett | 92/12.1 |
| 3,248,956 | 5/1966 | Kuhn | 74/53 X |
| 3,422,657 | 1/1969 | Grombka | 72/405 |
| 4,334,439 | 6/1982 | Kadymir | 74/665 GA |
| 4,381,739 | 5/1983 | Fisher | 123/54 B |

FOREIGN PATENT DOCUMENTS

| | | | |
|---|---|---|---|
| 891117 | 3/1962 | United Kingdom | 92/12.1 |

*Primary Examiner*—Rodney H. Bonck

*Attorney, Agent, or Firm*—Armstrong, Nikaido, Marmelstein & Kubovcik

[57] ABSTRACT

A cam-type hydraulic driving device for producing hydraulic pressure and distributing the same to a plurality of hydraulic actuator cylinders of a transfer feeder or the like apparatus. The cam-type hydraulic driving mechanism includes a plurality of rotary cams arranged in a common plane and on a common circle around a driving means by which the cams are driven rotatingly, and plungers adapted to be driven by the cams thereby to produce the hydraulic pressure. The cams are easily accessible simply by removing a cover of a frame of the apparatus, so that the inspection and maintenance are facilitated considerably.

2 Claims, 2 Drawing Figures

CAM-TYPE HYDRAULIC DRIVING DEVICE

BACKGROUND OF THE INVENTION

The present invention relates to a cam-type hydraulic driving device for use in combination with actuators sequentially brought operative such as actuators for actuating a transfer feeder which is used for feeding articles successively to a series of stations in a press.

A typical conventional driving mechanism for transfer feeder has a cam shaft disposed in a feeder box with its axis extended horizontally. The cam shaft carries a plurality of cams fixed thereto. In most cases, the cams and the cam shaft are disposed below the level of the floor on which the machine is situated. Therefore, in order to change or replace the cam, it is necessary to take various steps such as removal of a pit cover, partial disassembling of the feeder box, horizontal withdrawal and lifting of the cams and cam shaft by means of a crane. In addition, the protective maintenance and inspection of the cams are difficult to conduct because the cams which are disposed in a cam box are not easy of access.

SUMMARY OF THE INVENTION

Accordingly, an object of the invention is to provide a cam-type hydraulic driving device which is improved to overcome the above-described problems of the prior art.

To this end, according to the invention, there is provided a cam-type hydraulic driving device comprising a frame, a plurality of cams mounted in circular arrangement on said frame to be rotatable substantially in a common plane, a plurality of cylinders, each having at least one variable chamber defined by a reciprocating plunger driven by each said cam and hydraulically connected to a hydraulic actuator, and a driving means for driving said cams.

In a preferred embodiment of the invention, said frame is provided with a cylindrical chamber defined by a cylindrical wall for coaxially housing said circular arrangement of cams and a plurality of roller levers, each being pivotally supported at its one end and carrying at its other end a roller in rolling contact with each said cam to be swung in accordance with rotation of said cam thereby to impart reciprocating movement of each said plunger, and each said cylinder is displaceably fixed to said cylindrical wall to be adapted to displace in the circumferential direction along said cylindrical wall to change its position relative to said roller lever associated therewith thereby to change the stroke of the plunger.

The above and other objects, features and advantages of the invention will become clear from the following description of a preferred embodiment taken in conjunction with the accompanying drawings.

DESCRIPTION OF THE PREFERRED EMBODIMENT

Figure 1:
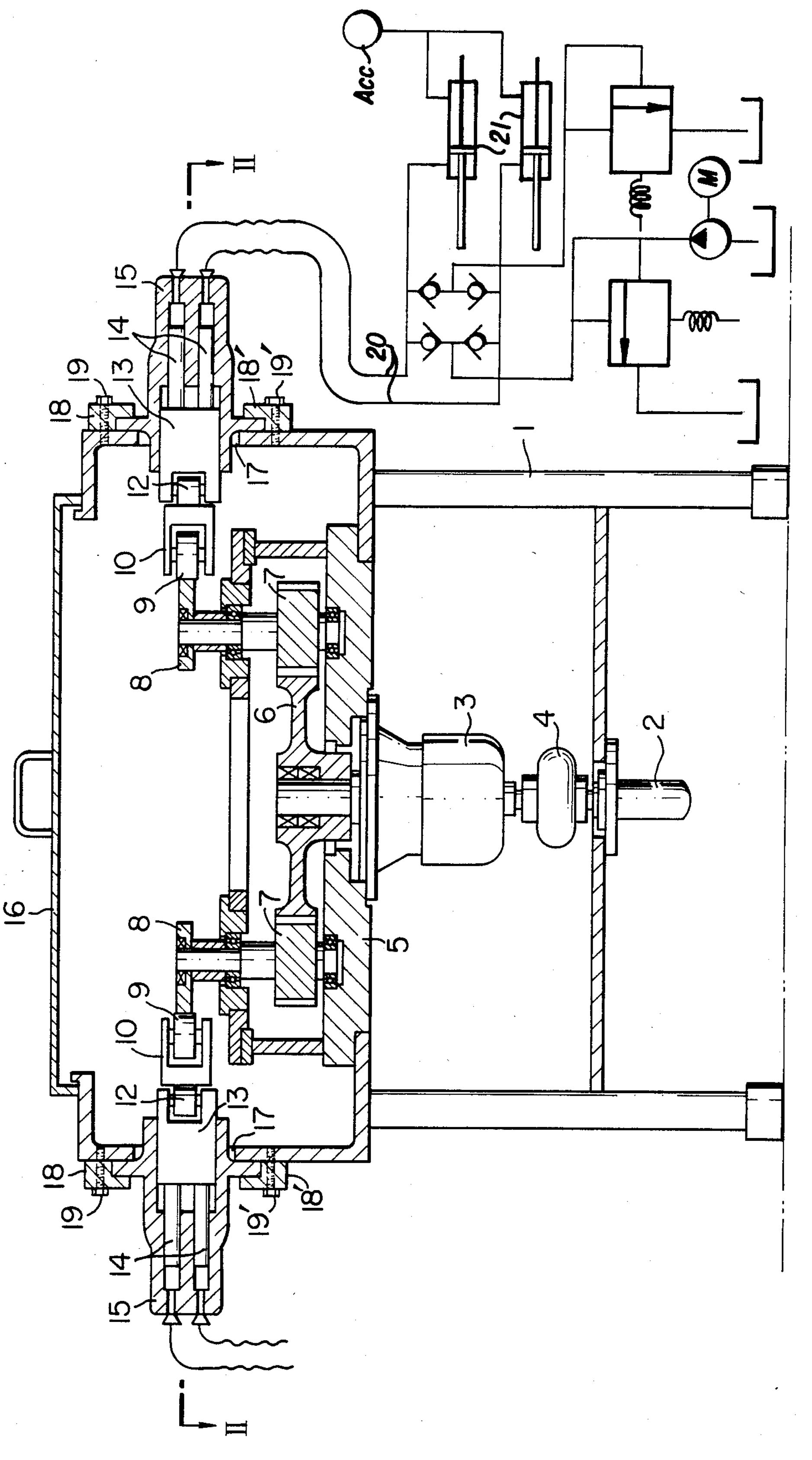
FIG. 1 is a vertical sectional view of a cam-type hydraulic driving device in accordance with a preferred embodiment of the invention.

Referring to the drawings, a cam-type hydraulic driving device in accordance with a preferred embodiment of the invention has a hydraulic motor as a prime mover 2 secured to a frame 1. A reduction gear 3 is coupled at its one end to the hydraulic motor 2 through a coupling 4. The reduction gear 3 is supported by a retainer 5 which is fixed to the frame 1. A wheel gear 6 fixed to the output shaft of the reduction gear meshes with a plurality of pinions 7. In the illustrated embodiment, there are four pinions 7 fixed to shafts rotatably held by respective bearings. A cam 8 is fixed to the upper end of the shaft of each pinion 7. Thus, in the illustrated embodiment, four cams 8 are arranged in a substantially horizontal plane and on a common circle centered at the center of the wheel gear 6. Each cam 8 is contacted by a cam follower roller 9 which is rotatably carried on a roller lever 10 by means of a shaft. The roller lever 10 is provided at its one end with a pin 11 by which it is supported pivotally on the frame 1. Thus, the roller lever 10 is adapted to swing around the fulcrum constituted by the pin 11.

Figure 2:
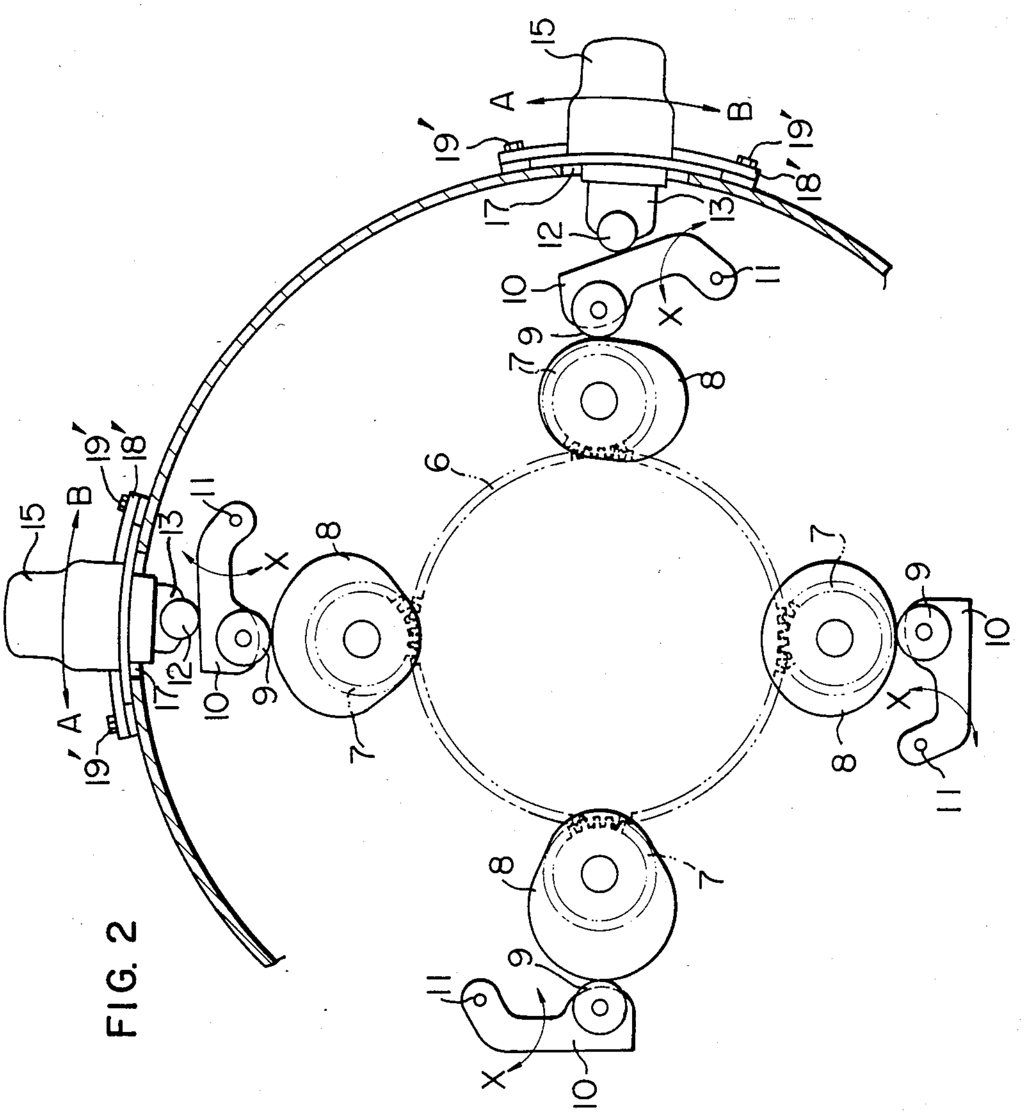
FIG. 2 is a sectional view of the cam-type hydraulic driving device taken along the line II–II of FIG. 1.

A roller 12 is rotatably carried on a reciprocatable member 13 through a shaft and is held in contact with each roller lever 10. The arrangement is such that the reciprocatable member 13 is adapted to move reciprocatingly and slidingly within a cylinder 15 as the roller lever 10 is swung as indicated by arrows X in FIG. 2 in accordance with the rotation of the cam 8. In the illustrated embodiment, the cylinder 15 has two axial bores each of which slidably receives a plunger 14 connected to the reciprocatable member 13. The cylinders 15 are disposed radially around the axis of the wheel gear 6 and are held securely on the cylindrical wall of the frame 1 encircling the driving mechanism including the wheel gear 6, pinions 7, cams 8 and roller lever 10. These cylinders 15 are connected hydraulically through pipes 20 to respective hydraulic actuator cylinders 21 for actuating a transfer feeder. Each cylinder 15 is received by corresponding elongated hole 17 formed in the cylindrical wall of the frame 1, and is fixed to the frame 1 by means of the guide plates 18, 18′ which are disposed at the upper side and lower side of the elongated hole 17 and secured to the cylindrical wall of the frame 1 by means of bolts 19, 19′. The position of the cylinder 15 is adjustable by moving the same in the circumferential direction, i.e. in the directions of the arrow A or B in FIG. 2, after loosening the bolts 19, 19′. A reference numeral 16 designates a top cover of the frame 1. The cams 8 can be observed as shown by plan view in FIG. 2 as the top cover 16 is removed.

In operation, the hydraulic motor 2 is started as it is supplied with pressurized oil. The torque of the hydraulic motor 2 is transmitted through the coupling 4 and the reduction gear 3 to the wheel gear 6 thereby to rotate the latter. In consequence, the pinions 7 meshing with the wheel gear 6 are rotated to rotatingly drive the cams 8 thereon. As a result of rotation of each cam 8, the associated roller lever 10 is swung as indicated by arrows X in FIG. 2. Consequently, the reciprocatable member 13 moves reciprocatingly within the cylinder 15 to cause a reciprocating motion of each plunger 14 within corresponding axial bore in the cylinder 15. As a result of the reciprocating motion of the plungers 14, a predetermined amount of oil is displaced to the associated actuator cylinder of the transfer feeder. The stroke of the plungers 14 can easily be adjusted by changing the lever ratio of the roller lever 10 through changing the position of contact between the roller 12 and the roller lever 10. This can be made simply by moving the cylinder 15 in the direction of the arrow A or B after loosening the bolts 19, 19'.

Needless to say, the number of cams 8 and, hence, the number of the cylinders 15 may be increased or decreased to match for the number of the actuator cylinders, although the illustrated embodiment incorporates four cams and four cylinders. It will be clear to those skilled in the art also that an equivalent effect is achieved when the hydraulic motor as the prime mover is substituted by an electric motor.

As has been described, the present invention provides a cam-type hydraulic driving device having a plurality of cams arranged substantially in the same plane and on a common circle.

This novel construction of the cam-type hydraulic driving device offers the following advantages.

First of all, it is to be noted that the cams become easy of access simply by the removal of the top cover, so that various works such as phase adjustment and other protective maintenance of the cams, as well as the inspection of the same, are very much facilitated. It is quite advantageous that these works can be made by human labor solely without necessitating any assistance by crane or the like apparatus. Furthermore, partly because the assembling and disassembling are facilitated and partly because one or more cams can be changed as desired without requiring demounting of other cams, the readjustment of the cam-type hydraulic driving device can be made easily and promptly to meet any change in the specification of the transfer feeder.

Although the invention has been described with specific reference to a cam-type hydraulic driving device for use in combination with a transfer feeder, such a use is only illustrative and it will be clear to those skilled in the art that the cam-type hydraulic driving device of the invention can be applied to various other uses.

In addition, although the cams are arranged in a horizontal plane, this is not exclusive and the cams may be disposed in a substantially vertical plane. In such a case, needless to say, the wheel gear is arranged to rotate around a horizontal axis.

Other changes and modifications are possible without departing from the scope of the invention which is limited solely by the appended claims.

What is claimed is:

1. A cam-type hydraulic driving device, comprising:

a frame provided with a chamber surrounded by a vertically extended wall;

a plurality of cams disposed within said chamber and in circular arrangement in a common horizontal plane, each of said cams being rotatable about a vertical axis;

a plurality of hydraulic cylinders disposed in circular arrangement concentrically surrounding said circular arrangement of cams, each of said cylinders having at least one variable chamber defined by a reciprocating plunger driven by a corresponding one of said cams and hydraulically connected to a hydraulic actuator and being fixed to said wall such that said plunger is directed radially;

a driving means for driving said cams; and a roller lever pivotally supported at its one end in said chamber and carrying at its other end a roller in rolling contact with each said cam to be swung in accordance with rotation of said cam thereby to impart reciprocating movements of a predetermined stroke to each said plunger, and wherein each said cylinder is displaceable in the circumferential direction along said wall to change its position relative to said roller lever associated therewith thereby to change the stroke of the plunger.

2. A cam-type hydraulic driving device, comprising:

a frame provided with a cylindrical chamber surrounded by a vertically extended cylindrical wall;

a plurality of cams disposed within said cylindrical chamber and in circular arrangement in a common horizontal plane, each of said cams being rotatable about a vertical axis;

a plurality of hydraulic cylinders disposed in circular arrangement concentrically surrounding said circular arrangement of cams, each of said cylinders having at least one variable chamber defined by a reciprocating plunger driven by a corresponding one of said cams and hydraulically connected to a hydraulic actuator and being fixed to said cylindrical wall such that said plunger is directed radially;

a driving means for driving said cams; and a roller lever pivotally supported at its one end in said cylindrical chamber and carrying at its other end a roller in rolling contact with each said cam to be swung in accordance with rotation of said cam thereby to impart reciprocating movements of a predetermined stroke to each said plunger, and wherein each said cylinder is displaceable in the circumferential direction along said cylindrical wall to change its position relative to said roller lever associated therewith thereby to change the stroke of the plunger.

* * * * *